US009892375B2

(12) United States Patent
Klein et al.

(10) Patent No.: US 9,892,375 B2
(45) Date of Patent: *Feb. 13, 2018

(54) WEB BASED TEMPLATE REPORTING SYSTEM

(71) Applicant: AutoDocs, LLC, Vienna, VA (US)

(72) Inventors: Michael Klein, Falls Church, VA (US); Andrew Gifford, Columbia, MD (US)

(73) Assignee: AutoDocs, LLC, Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/202,015

(22) Filed: Jul. 5, 2016

(65) Prior Publication Data

US 2016/0364671 A1 Dec. 15, 2016

Related U.S. Application Data

(63) Continuation of application No. 13/542,043, filed on Jul. 5, 2012, now Pat. No. 9,384,464.

(60) Provisional application No. 61/504,564, filed on Jul. 5, 2011.

(51) Int. Cl.
G06F 17/30 (2006.01)
G06Q 10/06 (2012.01)
G06Q 10/10 (2012.01)
G06F 17/24 (2006.01)
G06F 21/62 (2013.01)
H04L 12/26 (2006.01)
H04L 29/08 (2006.01)

(52) U.S. Cl.
CPC ..... *G06Q 10/06375* (2013.01); *G06F 17/248* (2013.01); *G06F 17/3056* (2013.01); *G06F 17/30554* (2013.01); *G06F 17/30563* (2013.01); *G06F 17/30595* (2013.01); *G06F 17/30604* (2013.01); *G06F 17/30861* (2013.01); *G06F 21/6218* (2013.01); *G06Q 10/10* (2013.01); *H04L 43/06* (2013.01); *H04L 67/02* (2013.01); *H04L 67/1097* (2013.01)

(58) Field of Classification Search
CPC .............. G06F 17/30595; G06F 17/30; G06F 17/30554; G06F 17/3056; G06F 17/30563; G06F 17/30604; G06F 17/30902; G06F 17/30657; G06F 17/30867; G06F 17/30941
See application file for complete search history.

(56) References Cited

U.S. PATENT DOCUMENTS

| | | | |
|---|---|---|---|
| 6,065,002 | A | 5/2000 | Knotts et al. |
| 7,299,223 | B2 | 11/2007 | Namait et al. |
| 7,644,100 | B2 | 1/2010 | Chang et al. |
| 7,647,423 | B2 | 1/2010 | Das et al. |

(Continued)

*Primary Examiner* — Dung K Chau

(74) *Attorney, Agent, or Firm* — Blank Rome LLP

(57) ABSTRACT

A system for generating an on-line report that includes a host site connected to user terminals via the Internet. The host site has a relational database for storing data and a server connected to the database and to the Internet. Users access and manipulate data, create report templates, and customize and run reports on the host site. The host site includes web pages that display options for accessing the relational database to create a data framework, web pages that display options for accessing the data framework to design a report template, and web pages that display options for accessing the report template to customize and run at least one report.

22 Claims, 4 Drawing Sheets

(56) References Cited

U.S. PATENT DOCUMENTS

| | | | |
|---|---|---|---|
| 7,725,811 B1* | 5/2010 | Bedell | G06F 17/30554 |
| | | | 707/792 |
| 7,844,587 B2 | 11/2010 | Blakeley et al. | |
| 7,954,087 B2 | 5/2011 | Zenz et al. | |
| 2002/0184043 A1* | 12/2002 | Lavorgna, Jr. | G06Q 99/00 |
| | | | 715/234 |
| 2005/0216830 A1 | 9/2005 | Turner et al. | |
| 2006/0206358 A1* | 9/2006 | Beaver | G06F 19/3487 |
| | | | 705/2 |
| 2007/0214010 A1 | 9/2007 | Beaver et al. | |
| 2008/0091709 A1* | 4/2008 | Chang | G06Q 10/06 |
| 2010/0262901 A1* | 10/2010 | DiSalvo | G06Q 40/04 |
| | | | 715/227 |
| 2011/0314034 A1 | 12/2011 | Adhikari et al. | |

\* cited by examiner

WEB BASED TEMPLATE REPORTING SYSTEM

CLAIM OF PRIORITY

This application is a continuation application of U.S. patent application Ser. No. 13/542,043, filed Jul. 5, 2012, now issued as U.S. Pat. No. 9,384,464, which claims priority under 35 U.S.C. §119(e) to U.S. Provisional Patent Application Ser. No. 61/504,564, filed on Jul. 5, 2011, which are hereby incorporated by reference in their entirety.

FIELD OF INVENTION

The present invention relates to a system and method for creating and generating custom reports over the Internet or an Intranet.

BACKGROUND OF INVENTION

Generating custom reports to assist end users in understanding data is a central requirement in many business environments. Storing the appropriate data in computer systems alone does not allow end users to understand the data in a way that will help them make business decisions. To promote effective data analysis, reports are developed to display the data in a configuration that can be understood by the business users.

The requirements for the reports that are needed by the business units are dictated by the business users. However, in many reporting systems, the actual development or programming of the reports is too complex for the business users, who are generally non-technical users. Thus, the task falls to report developers, who are Information Technology specialists, not specialists in the particular business area of the business user, to generate the reports needed by each business unit.

While the report developers are not familiar with the business, the business users are not familiar with the technology infrastructure. Often, there is information lost in translation when these two groups communicate, which can result in inefficiencies in the business process.

In most organizations, the personnel in the Information Technology department who are qualified to program reports are far outnumbered by the business users. Thus, reporting needs of business users cannot always be met promptly. Information Technology personnel may also attempt to consolidate reporting requests made by non-technical personnel in order to reduce the workload. Although creating a report that can be used by more than one business unit is desirable, sometimes the specifics that each business user may prefer must be sacrificed. So although the reporting request can be filled faster, the end result may not be ideal for any of those people who will use the report.

A reporting system where business users can design and execute their own reports is desirable. This system allows the business users to get what they want without having to articulate their needs to the report developers.

There are some ad hoc reporting systems, such as Crystal Reports and Business Objects, which have presented business users with graphical user interfaces that allow them to generate their own reports. However, these systems have proved complicated for business users, so companies that purchased this software have reverted to relying on report developers to program the reports and then the end users, the business users, generate the reports. In these systems, the report is designed, programmed, and configured by the report developer and the business user, at most, hits a button to "run" the report.

When business users are limited to running reports only, they lose flexibility because they do not have the full range of design capabilities open to the report developers. Once a report is in use, a business user may need to have a small change made to the report because of a changed business need or a mistake in the original requirements. When business users can only run the report, the developer must become involved in every small change so business needs cannot always be met promptly.

Another problem with this distribution of labor is that a business user will have no understanding of what is a difficult and time-consuming change and what is a small change. When the business user gives the requirements to the report developer, the business user may leave out some information that he or she needs. When requesting the addition to this report, what seems like a "small change" to the business user, who is unfamiliar with report development, is actually very time-consuming. Also, had this "change" initially been included in the original specification, the report developer may have taken a different approach. Sometimes it is extremely difficult to make changes midstream.

But allowing business users to develop their own reports can waste company resources. In a complicated reporting system, a business user who is not a professional report developer will take a large amount of time to develop reports, time that could be better spent in that person's business role. Sometimes business users are so unsuccessful that a professional report developer must be called in after the business user wastes time attempting to design a report.

Even a business user who is successful in developing a report could make mistakes. Unfamiliar with the data architecture, the business user could create a flawed report, which could influence business decisions. Even if the report is accurate, the business user may not have crafted it in a way that used Information Technology resources efficiently. A business user may develop a report that, when executed, wastes database and network resources and causes problems for the Information Technology department and other users on the network.

A reporting system and method is needed that guards the efficiency of the technology infrastructure from the non-technical business user, but still allows this non-technical business user to access reports with enough flexibility that every change request does not necessitate the involvement of a professional report developer.

SUMMARY OF INVENTION

The object of the present invention is to provide an Internet-based reporting system and method that empowers business users to generate and edit their own reports without wasting valuable human and technology resources. To empower end users under these controlled conditions, the tasks for creating business reports are divided into "layers." The individual layers of the system and method contain tasks that are designated for different types of users depending upon their technical and/or business knowledge.

All three layers of the system and method work together to create and generate reports for the business user.

In the first layer, the most technical user (Type A), for example, a report developer, creates a framework for report development.

In a second layer, the more technical business user (Type B) develops report templates, general reports that can be utilized as developed or customized further by, for example, a non-technical business user.

In the third layer, the business user (Type C) generates reports, but also can customize reports within the boundaries set by the corresponding report templates by making certain controllable changes to the report templates created by the "technical" business user. This division of labor results in a more efficient use of both human and technology resources.

Each user, Type A, Type B, and Type C, interacts with the reporting system through a graphical user interface (GUI). All GUIs are accessible via the Internet to minimize the need for training on a new application and allow the system to be accessible across different platforms.

DETAILED DESCRIPTION OF THE INVENTION

The present invention involves an Internet-based reporting system and method with different roles or layers for each type of user, according to the technical knowledge and/or business role of each user. Ultimately, this system and method empowers business users to generate and edit their own reports without wasting valuable human and technology resources.

To empower end users under these controlled conditions, the system and method for creating business reports has "layers." The individual layers include functionality that can be practiced by different users. The functionality is apportioned to the layers depending upon the level of technical difficulty required to perform each function. In one embodiment, there are three layers of functionality, one for each type of previously discussed user: Type A, Type B, and Type C.

The Type A user has an understanding of the architecture of the database and how to join tables efficiently and write stored procedures that will later be accessed by reports.

The Type B user has an understanding of the business reason for reporting on the data as well as the elements or specifications of the reports that will be needed by the end user. The Type B user does not need to understand the database, including low level database structural features, like how tables are linked, and which set of tables are required to return the logically connected data elements associated with a report.

The Type C user is a business user who will be accessing reports in order to make business decisions. No technical knowledge or understanding of databases is required to be a Type C user. Type C users include but are not limited to internal non-technical business users and external clients of a service provider that is supplying reports to its customers over the Internet.

Figure 1:
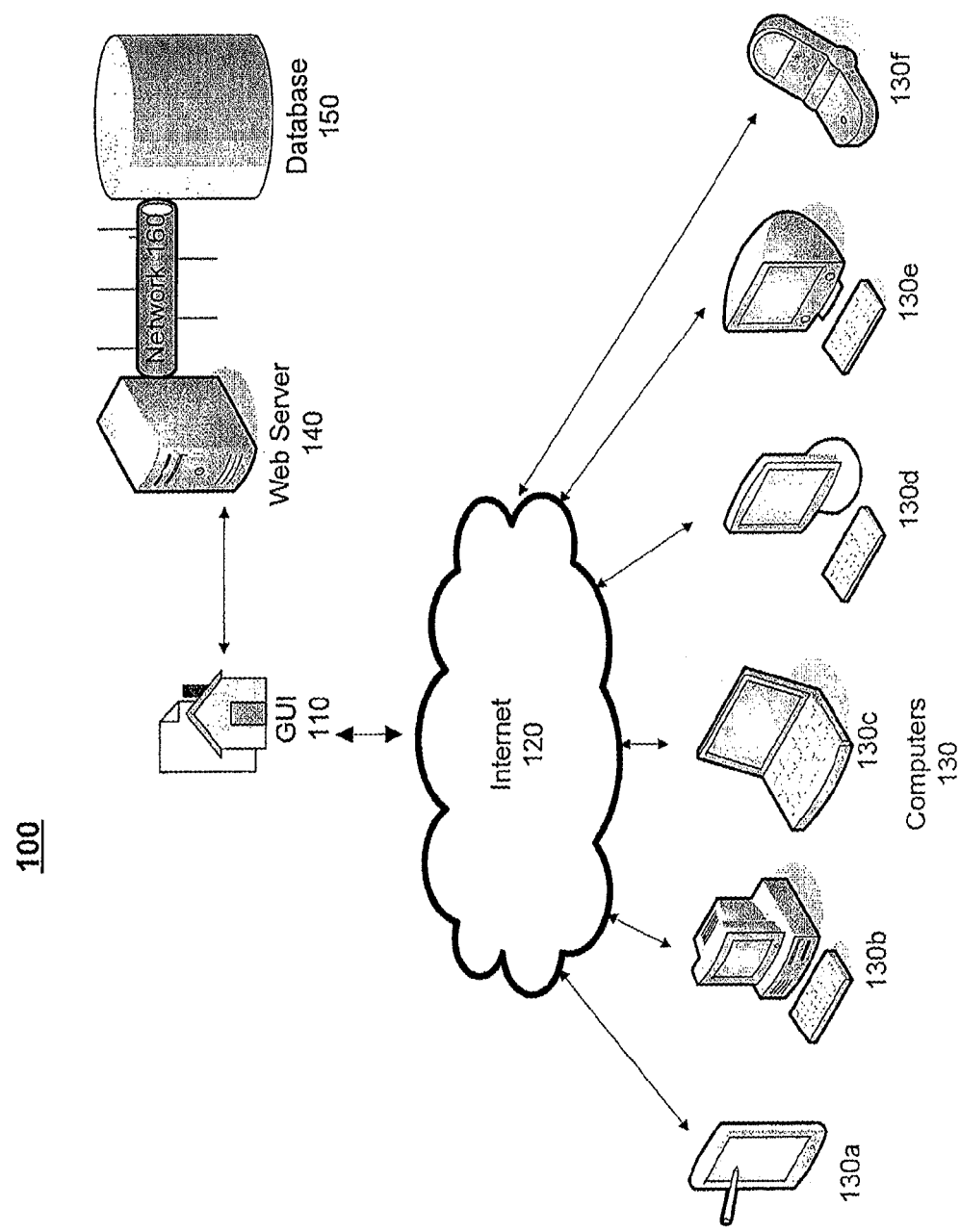
FIG. 1 depicts a technical architecture, according to an embodiment of the present invention.

Referring to FIG. 1, the technical architecture 100 of an embodiment of the claimed system used to practice the method of the invention includes a graphical user interface ("GUI") 110, that can be accessed over an Internet connection 120 at a user terminal 130. User terminals 130a-f include but are not limited to data terminals, workstations, portable computers, and/or smartphones. The user terminal 130 interacts over the Internet 120 with a web server 140. The web server 140 serves the GUI 110 to the user at the user terminal 130. The web server 140 pulls the data visible through the GUI 110, the front end of the application, from a database 150, the back end of the application, over a network connection 160. In one embodiment, the GUI 110 is a standard Web Browser so no specialized software must be installed on the user terminal 130 to access the reporting system software. However, any form of Web Browser or web connection can be used. The database 150 is a relational database, including but not limited to Microsoft SQLServer, Sybase, and/or Oracle.

Users may design, customize, and generate reports in a large variety of settings and with a variety of user terminals 130a-f. A user may access reports using mobile devices, including but not limited to a handheld device 130a, and/or a laptop computer 130c, and/or a smartphone 130f. Through these devices, a user could quickly pull up a report in a situation, like an off-site meeting, when data is needed quickly and a trip would waste time and break the workflow of the meeting. Desktop computers 130b, 130d, and 130e, although all personal computers, which include at least Windows computers and Macintosh computers, would all be able to access reports with equal success because the reports are deployed through a standard Web Browser, so no additional customization of the application is necessary on the client side.

A user can access the Internet 120 and view and interact with the GUI 110 on a variety of different user terminals 130a-f. The user terminals 130a-f in FIG. 1 are suggestions and are not meant to be all inclusive. A person of ordinary skill in the art will recognize that GUI 110 can be accessed from any user terminals that access the Internet.

Figure 2:
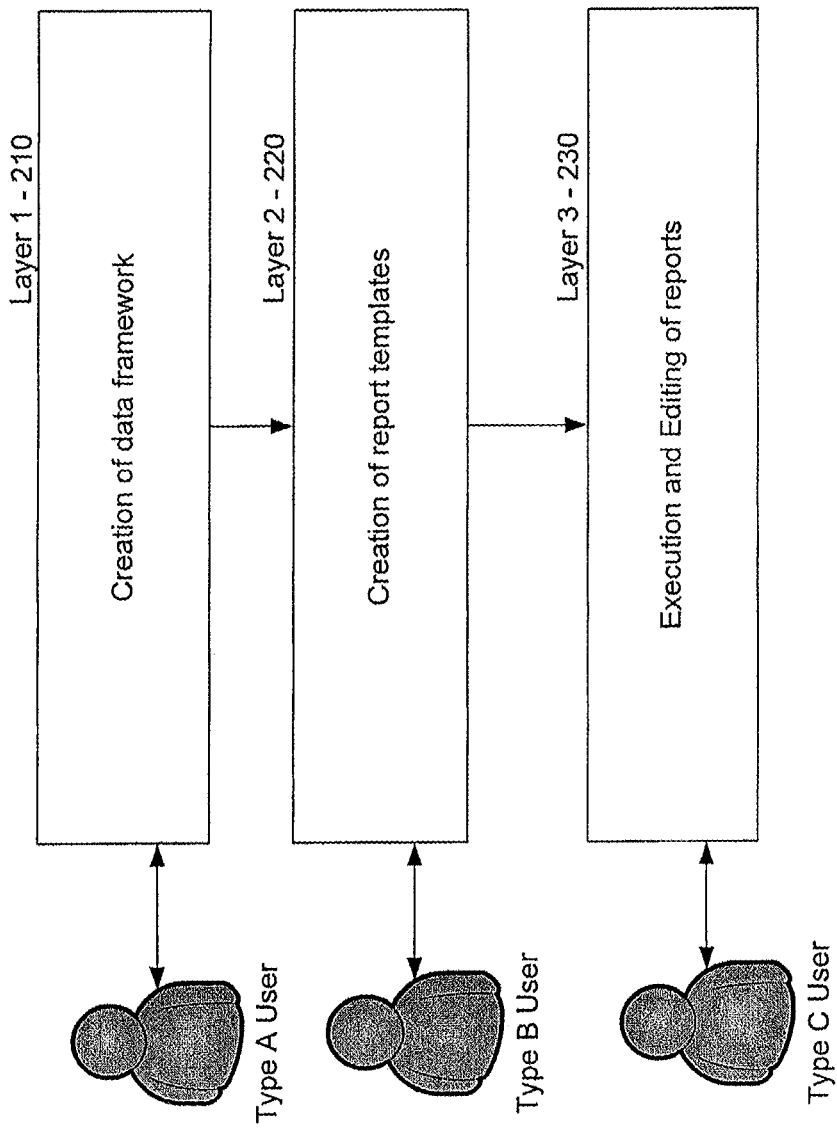
FIG. 2 depicts the interfaces and functionality used in an embodiment of the present invention.

Referring to FIG. 2, each type of user accesses a different "layer" of the system over the Internet, through a GUI 200. The functionality of each layer is displayed in the GUI 200 in accordance with the user type.

In a three-layer embodiment of the invention, in the first layer 210, the Type A user accesses functionality that allows this user to create a data framework. In the second layer 220, the Type B user accesses functionality that allows this user to develop report templates by accessing the data framework created by the Type A user. In the third layer 230, the Type C user accesses functionality that allows this user to execute and edit the report templates created by the Type B user.

Figure 3:
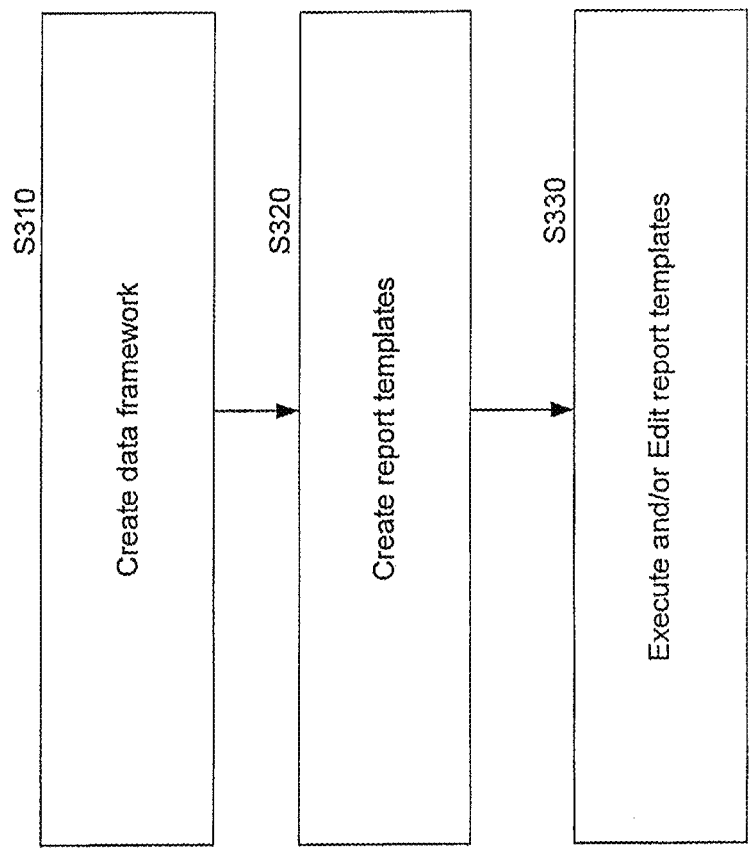
FIG. 3 depicts the workflow of an embodiment of the present invention.

FIG. 3 depicts an exemplary embodiment of the workflow in the claimed system and method 300. First, the Type A user creates a data framework (S310). Then, the Type B user creates report templates (S320). Finally, the Type C user executes and/or edits the report templates to customize the report (S330). A more detailed explanation of the workflow is set forth below.

Layer 1—The Data Framework

Type A user utilizes the first layer 210 to create a data framework (S310).

Creating a data framework is a technically difficult task. The data that a business user requires in a given report may be stored in many different database tables and may also require manipulations, including but not limited to calculations and complex SQL queries to produce a useable report. A business user may not have the technical knowledge to create efficient joins or code the efficient and correct stored procedures necessary to develop reports.

The Type A user, who understands the database structure and the data dictionary, uses the GUI on the first layer 210 to manipulate the data in the database into a data set or report category. A data set can be understood as a subdivision of the entire database. Rather than contain all the fields in the database, this data set would only contain the fields relevant to a given report category. In addition to fields, the data set can also contain calculations that a business user may wish to see in reports in a given report category. Some fields that a business user would desire in a report may have values that are stored in fields of the database. Some desired fields or values may not actually be stored in the back-end database as fields but can be derived through a calculation or data translation or transformation.

The Type A user produces the framework in the first layer 210 by creating data objects, including but not limited to database views and stored procedures as well as queries that may access views and stored procedures. The Type A user can isolate different types of data into sets that will be useful depending upon the type of reports that are required by the business users.

In this three-layer embodiment, data groupings that the Type A user creates through the first layer 210 (S310) include but are not limited to:

Report Categories—

Sets of logically linked tables that are displayed through the GUI used by the Type B user as top level reporting units. The fields in the columns that the Type A user pulls into each report category have a one-to-one relationship. For example, a database may contain information about the employees in a given company. The fields in a table of employee names would have a one-to-one relationship with the fields in a table of work email addresses for these employees, i.e., one work email address would exist for each employee name. The definition of a report category includes defining the manner by which the tables are linked.

The fields that are selected by the user for inclusion in the report categories are the fields that will be available for inclusion in reports that are designed in the next layer of the invention. The Type A user may rank the fields to delineate their importance in a report. If the Type A user makes these designations, the rankings can be viewed by the Type B user on the next level. In this manner, the Type A user can communicate with the Type B user regarding report development, using the system as a medium.

Child Reports—

Sets of logically linked tables, each of which has a many-to-one relationship to the report category or categories to which it might be attached. For example, in a database containing information about employees in a given office, the fields in a table of employee names may have a one-to-many relationship with the fields in a table of employee phone numbers, i.e., each employee could have multiple numbers including home, work, fax, and cell phone number. The definition of a child report includes the links among the tables.

The Type A user may assign child reports to a report category. Once this association is made, the child report can appear as an option to a user designing a new report in the associated report category. A child report is similar to a report category because it will also be configured to contain a group of fields or values that can be selected for inclusion in a report during the design phase.

Code is sometimes required to adjust the data in a report category and/or a child report so it is more user-friendly when viewed in that report. Code which needs to be executed after running a report on a specified report category or child report (typically for cleanup) can also be associated to the report category or child report. For example, if the back end of the system is a SQLServer or Oracle database, code is often executed on fields that contain dates in order to display these dates in a user-friendly format. A well designed report category and/or child report will link to the reference tables necessary to present the data intelligibly to end users.

Special Criteria—

Filters which might be applied to each report category that require logic more extensive than simple operations on the values from a single field in a report category or a child report. For example, a report organized based on a company level report category on data in a multi-company accounting system might have a special criterion to return companies where cash flow in the last quarter was less than 80% of the average for the 4 quarters prior to that.

Executable Code—

Additional code required to obtain or correct the data in a report category.

If any code needs to be executed prior to running a report to make the data available, which will be used by reports on a report category or its child reports, that code can be linked to the appropriate report category or child report. Certain data may only be available if code is executed before the report is run. For example, a company runs internal contests among its salespeople and the winner is the person whose sales generated the largest gross margin. Gross margin for each salesperson can be calculated by a stored procedure which sums the margin at the time of the sale (since margin might vary over time) on each product sold times the number of units sold. The margin data is stored in the database for each product and time period and is not directly associated with orders. Code executed before a report may be necessary to translate the values in certain fields into information that is understood by the end user. Sometimes the data stored in a database table is stored as a code that will not make sense to the business user in a report. For example, the office locations of employees in a company may appear in a table called Employees as numbers that coordinate to each office location. Another table in the database called Offices will contain the numbers that appear in the Employees table and their mappings to the actual names of the offices. An employee in office 1 could actually mean an employee in New York. For the employee location to appear as "New York" instead of "1" in a report, code must be executed to translate the data.

Complex data formatting, including but not limited to creating display addresses, will normally be done by pre-processing code.

Code may be required to be executed after a report is run as well. In one embodiment, post-processing code is run to delete any temporary tables in the database that were required to create the report.

Formatting—

Any preferred formatting, special processing, including but not limited to minimum display size, and instructions to hide fields in the tables of the report categories and child reports that should not appear on any reports. For example, some tables may contain internal identifiers that would not be meaningful to a business user if displayed in a report.

Layer 2—Report Templates

The Type B user creates report templates (S320) in the second layer 220. A report template is a basic report that can be tailored by a business user or used without any changes. For example, a report template for a sales report may list the salesperson, the office location of this person, the title of the person, the number of sales each quarter, and the commissions paid on those sales. A business user who accesses this report may wish to see something more specific than the template, such as only the sales for a given period and for a given office location. The business user can then customize the template in the third layer.

In the second layer of the system and method, when the Type B user accesses a GUI in the second layer 220, all the objects that were created by the Type A user (S310) in the first layer 210 are visible and available to the Type B user. The Type B user can select the data objects in the data framework to create report templates (S320).

Figure 4:
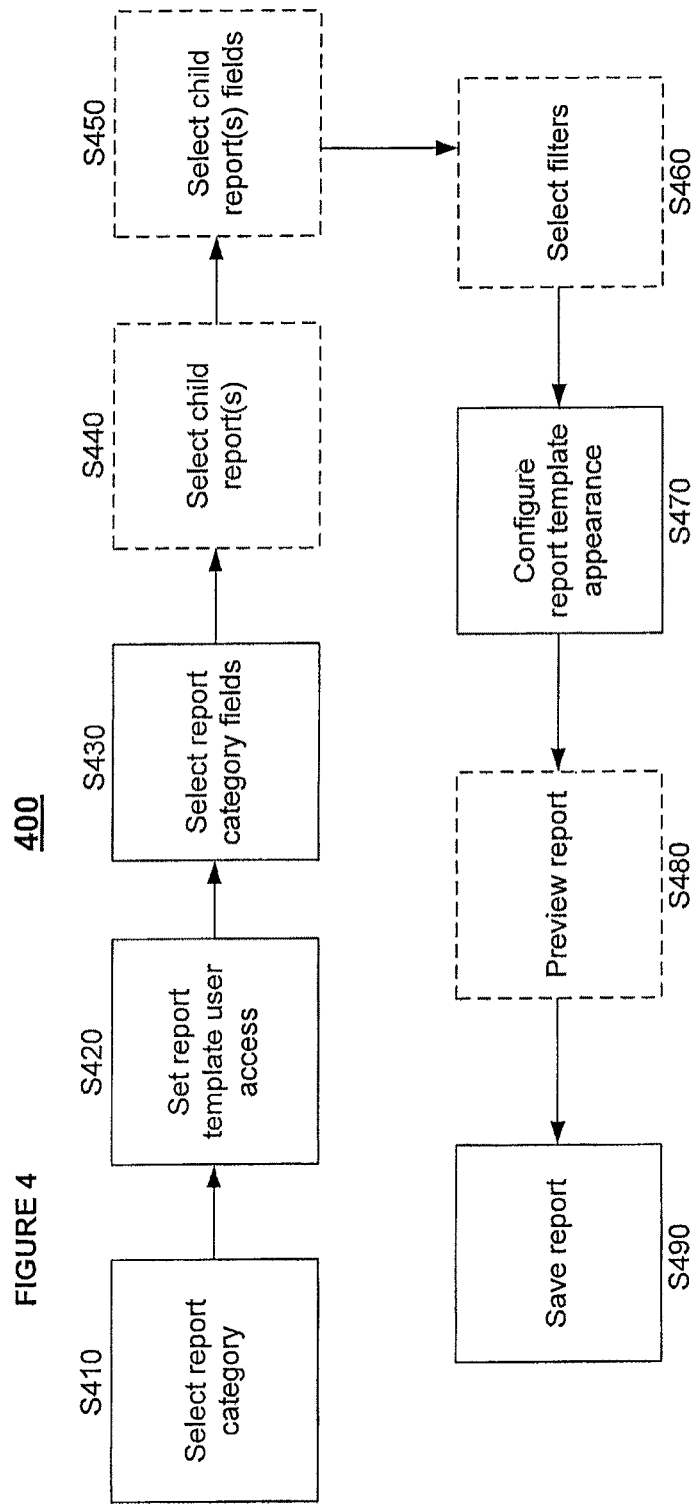
FIG. 4 depicts the workflow of the second layer of an embodiment of the present invention.

In one embodiment of the invention, the Type B user can follow the workflow 400 in FIG. 4 in order to create a report template.

First, the Type B user selects a report category (S410); A report category, created by the Type A user in the first layer, is a grouping of fields that a business user would optionally desire to see on a report on a given subject. A report category of sales reports could contain information such as the names of salespeople working for a company and their commission rates. In this report category, the fields have one-to-one relationships. For example, in a client contact report category, the fields available could be first name, last name, and company.

After selecting a report category, the Type B user may elect which end users will have access to this report template, once the template is completed (S420). Options include but are not limited to assigning the report to a group of users or choosing specific users who may access the report. Permission to access this report may be assigned to users internal to the company that is developing the reports or to external users, or clients of the company that is developing the report.

The Type B user can now select the fields that will appear on the report template (S430). At this stage, the GUI in the second layer 220 may optionally display all the fields that are "available" in the selected report category. "Available" fields are those selected for inclusion in the report category by the Type A user in the first layer 210. If a ranking were assigned to these available fields by the Type A user, these could optionally appear on the screen as well as a guide to the report developer. From the available fields, the Type B user can select fields for inclusion in the report template.

At this step, the Type B user can choose to designate certain fields as mandatory.

When a field is designated as mandatory, a record with that field will only appear on the report if there is a value in that field. For example, in a list of active employees, the user may choose only to display in the report the employees who have a start date. No start date could indicate that the employee has not started working at the company yet.

The Type B user also may have the option of selecting child reports (S440). A child report contains additional information that the business user may wish to see on a report, but the relationship between the data in the child report and the main report would not be one-to-one. For example, a child report for a general sales report could be a list of active clients for each salesperson. While information such as the name of the salesperson and the commission rate could be included in the report category and displayed in one row of a report, the list of clients could not easily appear in the main body of this report because of the one-to-many relationship between the salesperson and his or her active clients. Thus, the client list would be considered a child report. The aforementioned general sales report could have child reports such as active clients and sales per client. The Type B user can select more than one child report from the child reports that were associated with the report category by the Type A user.

The Type B user may select the fields in the child reports for inclusion in the report template (S450). The child reports are similar to the report category in that they have lists of fields that may be selected for inclusion by the Type B user.

Optionally, the Type B user may decide to apply filters to the report (S460). A wide range of filters is available in this system and method. Filters can include traditional operations on fields in the report, and on its associated report category, and child reports.

Filters that can be added include but are not limited to pre-defined filters and field-specific filters. Pre-defined filters are those that access some of the executable code that was developed by the Type A user. Pre-defined filters include but are not limited to questions or prompts that the user would like to appear to the end user before the report is run that may require a complex calculation. Field-specific filters allow the user to control the results by placing parameters on specific fields in the report category, whether or not the user selected those fields for display in the report template.

Filters can be designated as mandatory (i.e., applicable every time the report is run) or optional. If a filter is designated as optional, the Type C user will be able to edit the filter to turn the filter on or off when he or she executes the report. If the filter is mandatory, it must be applied to the report for the report to run. Mandatory filters are useful to limit the date range for which a report can be run. Pulling all the data from a large amount of time may not be helpful to the user and may tax the system resources. Adding a filter to the report that requires the Type C user to limit the data to a range of time could increase the usefulness of the report as well as the efficiency.

Filters may also be designated as static or dynamic. Dynamic filters allow the filter criteria to change each time the report is generated. When the report is run, the end user will be prompted for the new value. A quarterly report could use this type of filter and the user could enter the dates for the new quarter each time that it is run. Static filters apply the same filter value each time the report is generated.

The Type B user may optionally apply the same or different filters to the child reports than to the main report. Taking the example of a sales report with a child report of client lists for active salespeople, a filter could potentially be applied to the main report, to fields in the associated report category that are not part of the report, and to the child reports. If in the main report, the Type B user includes the field "office location," a traditional filter includes but is not limited to instructing the report to retrieve only those salespeople who work in the Phoenix office. A filter can also be applied on a field that is not selected by the user for inclusion in the report template. The user may not choose the field "gender" as an option in the report, but may wish to filter by female salespeople. In the child report of active clients, the Type B user may wish to add a filter that includes in the child report only those clients who have made a purchase within the last quarter.

Once the filters are established (S460), the Type B user can configure the appearance of the report template (S470). Configuration options include but are not limited to default sorting, grouping, column layout, descriptive report information, and output format. The Type B user selects the default sorting of any data in the report. For example, the Type B user may choose to sort by employee last name, but group the employees by office location. The Type B user may select primary, secondary, tertiary, etc. sorting. The Type B user may designate the default order of the selected columns on the report. The Type B user may enter information that will appear on the report, including but not limited to title and any other descriptive information that could be helpful for the end user. The Type B user also selects the output format of the report, what type of file it will appear in, including but not limited to MS Word, MS Excel, HTML, and/or PDF.

Once the Type B user has completed development and design of a report template, the Type B user may preview the report (S480). The Type B user may also save the report (S490) for use by end users.

While the Type B user is designing a report template, in one embodiment of the invention, the system may alert the user as to how many records in the database the present configuration of the report template will retrieve. This real-time alert may guide the report development. For example, if the report template is listed as retrieving no results, the Type B user may conclude that there is something faulty in the report design. This feature allows design issues to be flagged before the end user ultimately runs the report.

Showing the number of records without requiring the Type B user to preview the report is advantageous because of its efficient use of human and technology resources. This topical view of the results can quickly alert the Type B user to a design flaw without taxing the system by generating the report. Also, the generation of a report is slower than just pulling the number of records so the Type B user does not have to sit and wait before realizing that he or she made a programmatical error.

In one embodiment of the present invention, depending upon the business role of the Type B user, the administrative functionality of the system may be included in the second layer 220. In this embodiment, the permissions for end users to access and generate reports is controlled in this layer. To grant permission to a user in one embodiment of the invention, the Type B user will view a list of completed report templates and enter users who may access designated reports. The user list could optionally be populated from a database or imported, so users could be selected from a list rather than entered from scratch.

The second layer 220 may offer more advanced functionality in certain versions of the system that are customized for organizations with report developers with a good understanding of the database. In this case, the Type B user may have permissions to configure certain data structures in the report categories that were established on the first layer. This second layer could include functionality allowing the Type B user to create a default sorting order for the data in each report category and/or functionality allowing the Type B user to select fields for inclusion in the report template.

Although the functionality of the system and method for creating and generating custom reports over the Internet is disclosed with the user performing the steps in a particular order, those skilled in the art will appreciate numerous modifications therefrom, including but not limited to re-ordering the steps as a customization for a particular group of users.

Layer 3—Reports

The report template that is created in the second layer by the system and method (S320) can be further customized by the Type C user in the third layer (S330). As aforementioned, the Type C user has access to certain "controlled" design functions. These functions are "controlled" because when the Type B user designs the report, he or she can optionally keep these options open, allowing the Type C user to customize the template.

Options that the Type C user may configure in the third layer include but are not limited to configuring filters, sorting, and/or grouping the report.

The Type C user may configure optional filters. If an optional filter is established during the report design phase, the Type C user can alter the data set that the report will display by entering different values into the filter. In the example of a date range optional filter, the Type C user can enter a date range on a report, thereby limiting or pre-processing the data before it is displayed in the final report by results valid only for that date range. The Type C user can also disable the optional filter so there is no requirement for data entry.

Another type of optional filter may require the Type C user to make a selection from a group of established values. For example, a transaction report template may prompt the Type C user to designate either reconciled or un-reconciled transactions or both.

The Type C user can also affect the appearance of the data on the report. Depending on how a report is designed, grouping and/or sorting the results can be a complex undertaking and require major changes to the code. In the method of the present invention, the Type C user can sort and/or group the results in the third layer.

Although a method for creating and generating custom reports over the Internet is disclosed, those skilled in the art will appreciate numerous modifications therefrom, including but not limited to the use of different types of private and public networks to access and transmit the data.

Although FIGS. 3-4 display the method as being executed in a specific order, no specific order is intended. For example, a Type B user may designate the final format of a report template before selecting filters for the report template.

Although a system and method for creating and generating custom reports over the Internet is disclosed as a three-layer system, those skilled in the art will appreciate numerous modifications therefrom, including but not limited to the consolidation of certain layers or the use of additional layers. It is intended that the appended claims cover all such modifications and variations as fall within the true spirit of the present invention.

Although the present invention has been described in relation to particular embodiments thereof, many other variations and modifications will become apparent to those skilled in the art. As such, it will be readily evident to one of skill in the art based on the detailed description of the presently preferred embodiment of the system and method explained herein that different embodiments can be realized.

What is claimed as new and desired to be protected by Letters Patent of the United States is:

1. A computer system for generating an on-line report comprising:
    a processor;
    a relational database for storing data sets;
    a server connected to the relational database and to an Internet connection, for accessing and manipulating data in the relational database in response to input, configuring report templates in response to input, customizing report templates in response to input, and sending reports created in response to input;
    a host site connected to at least one computer terminal via said Internet connection, said host site comprising:

a first group of web pages accessible to a Type A user displaying options for accessing the relational database to create at least one data framework, said displaying options further comprising:
  at least one relationship grouping formed between the data sets;
a second group of web pages accessible to a Type B user displaying options for accessing at least one data framework to design at least one report template, said Type B user displaying options further comprising:
  at least one filter being applied to at least one of the data sets and customizable data set attributes; and
a third group of web pages accessible to a Type C user displaying options for accessing at least one report template to customize and run at least one report;
wherein the computer system is configured to:
  receive a first group of selected options from said first group of web pages to create at least one data framework;
  apply said first group of selected options and create at least one relationship grouping between data sets;
  receive a second group of selected options from said second group of web pages;
  apply said second group of selected options and create at least one report template;
  receive a third group of selected options from said third group of web pages; and
  apply said third group of selected options and create at least one report.

2. The system of claim 1, wherein said at least one relationship grouping includes:
  at least one report category to group data with a one-to-one relationship between the data sets, and
  at least one child report to group data with a one-to-many relationship between the data sets.

3. The system of claim 1, wherein said at least one filter includes a pre-defined designation option which comprises applying an executable code to at least one of the data sets.

4. The system of claim 1, wherein said at least one filter includes a field-specific designation option which comprises applying specific parameters to at least one of the data sets.

5. The system of claim 1, wherein said at least one filter includes a mandatory designation option applied to the data sets.

6. The system of claim 1, wherein said at least one filter further comprises a preview report option based on said at least one filter and said customizable data set attributes.

7. The system of claim 6, wherein said at least one filter further comprises a display of a number of records included in said at least one report template that is generated contemporaneously with the design of said at least one template.

8. The system of claim 1, wherein said customizable data set attributes include a ranking option applied to the data sets, or a mandatory designation option applied to the data sets.

9. The system of claim 1, wherein said customizable data set attributes include at least one child report to group data with a one-to-many relationship between data sets.

10. The system of claim 1, wherein said options for accessing at least one report template to customize and run at least one report includes at least one filter for sorting of at least one of the data sets.

11. A method for generating an on-line report comprising:
  connecting a host site to at least one computer terminal via an Internet connection, said host site comprising a relational database for storing data and a server connected to the relational database and to the Internet;
  displaying, via a graphical user interface on said at least one computer terminal, options for accessing and generating reports for the relational database, wherein said options comprises:
    creating at least one data framework via a first group of options accessible to a Type A user for accessing the relational database, wherein said first group of options includes forming at least one relationship grouping between data sets,
    designing at least one report template via a second group of options accessible to a Type B user for accessing at least one data framework, wherein the second group of options for accessing the at least one data framework include applying at least one filter and customizing data set attributes, and
    customizing and running at least one report via a third group of options accessible to a Type C user for accessing at least one report template;
  receiving a first group of selected options from said first group of options to create at least one data framework;
  applying said first group of selected options and creating at least one relationship grouping between data sets;
  receiving a second group of selected options from said second group of options;
  applying said second group of selected options and creating at least one report template;
  receiving a third group of selected options from said third group of options; and
  applying said third group of selected options and creating at least one report.

12. The method of claim 11, wherein said forming of at least one relationship grouping includes forming at least one report category to group data with a one-to-one relationship between data sets and forming child reports to group data with a one-to-many relationship between data sets.

13. The method of claim 11, wherein said at least one filter includes the option to designate said at least one filter as pre-defined, wherein said pre-defined designation comprises applying an executable code to a data set.

14. The method of claim 11, wherein said at least one filter includes the option to designate said at least one filter as field-specific, wherein said field-specific designation comprises applying specific parameters to a data set.

15. The method of claim 11, wherein said at least one filter further comprises generating a preview report based on said application of at least one filter and said customization of data set attributes.

16. The method of claim 15, wherein said at least one filter further comprises generating, contemporaneously with the design of said at least one report template, a number of records included in said at least one report template; and displaying contemporaneously said number of records.

17. A computer program that includes a non-transitory computer-readable recording medium and a computer program stored on the non-transitory computer-readable recording medium, wherein when executed the computer program realizes a method of generating an on-line report, the computer program causing the computer to execute:
  displaying, on a computer terminal, options for accessing and generating reports for a relational database, wherein said options comprise:
    a first group of options accessible to a Type A user for accessing the relational database to create at least one data framework, wherein said first group of options include forming at least one relationship grouping between data sets, a second group of options accessible to a Type B user for accessing at least one data framework to design at least one report template, wherein the second group of options for accessing the at least one data framework include applying at least one filter and customizing data set attributes, and a third group of options accessible to a Type C user for accessing at least one report template to customize and run at least one report;

receiving, via a web server, a first group of selected options from said first group of options to create at least one data framework;

applying said first group of selected options and creating at least one relationship grouping between data sets;

receiving, via a web server, a second group of selected options from said second group of options;

applying said second group of selected options and creating at least one report template;

receiving, via a web server, a third group of selected options from said third group of options; and applying said third group of selected options and creating at least one report.

18. The computer program of claim 17, wherein said at least one relationship grouping includes forming at least one report category to group data with a one-to-one relationship between data sets and forming at least one child report to group data with a one-to-many relationship between data sets.

19. The computer program of claim 17, wherein said at least one filter includes the option to designate said at least one filter as pre-defined, wherein said pre-defined designation comprises applying an executable code to a data set.

20. The computer program of claim 17, wherein said at least one filter includes the option to designate said at least one filter as field-specific, wherein said field-specific designation comprises applying specific parameters to a data set.

21. The computer program of claim 17, wherein said at least one filter further comprises generating a preview report based on said application of at least one filter and said customization of data set attributes.

22. The computer program of claim 21, wherein said at least one filter further comprises generating, contemporaneously with the design of said at least one report template, a number of records included in said at least one report template; and displaying contemporaneously said number of records.

* * * * *